US 9,258,352 B2

(12) United States Patent
Khalife et al.

(10) Patent No.: US 9,258,352 B2
(45) Date of Patent: Feb. 9, 2016

(54) METHOD FOR TRANSMISSION IN A MULTI-DESTINATION NETWORK

(71) Applicant: THALES, Neuilly sur Seine (FR)

(72) Inventors: Hicham Khalife, Gennevilliers (FR); Jeremie Leguay, Gennevilliers (FR); Vania Conan, Gennevilliers (FR)

(73) Assignee: THALES, Neuilly sur Seine (FR)

( * ) Notice: Subject to any disclaimer, the term of this patent is extended or adjusted under 35 U.S.C. 154(b) by 166 days.

(21) Appl. No.: 13/910,513

(22) Filed: Jun. 5, 2013

(65) Prior Publication Data
US 2013/0326013 A1 Dec. 5, 2013

(30) Foreign Application Priority Data

Jun. 5, 2012 (FR) ...................... 12 01621

(51) Int. Cl.
*G06F 15/16* (2006.01)
*H04L 29/08* (2006.01)
*H04L 12/761* (2013.01)
(Continued)

(52) U.S. Cl.
CPC ............ *H04L 67/02* (2013.01); *H04L 12/1881* (2013.01); *H04L 45/123* (2013.01); *H04L 45/124* (2013.01); *H04L 45/16* (2013.01); *H04L 45/24* (2013.01); *H04L 47/28* (2013.01)

(58) Field of Classification Search
CPC ......... H04L 45/24; H04L 47/15; H04L 47/28; H04L 47/283; H04L 49/201; H04L 65/608; H04L 65/4076; H04L 69/14; H04L 45/16; H04L 45/123; H04L 45/124; H04L 67/02
USPC ....................................... 709/217
See application file for complete search history.

(56) References Cited

U.S. PATENT DOCUMENTS 7,486,683 B2 * 2/2009 Blanc et al. ............... 370/395.72
7,936,753 B1 * 5/2011 Colloff et al. ................. 370/390
(Continued)

OTHER PUBLICATIONS

El Rakabawy et al., "TCP with gateway adaptive pacing for multihop wireless networks with Internet connectivity," *Computer Networks, Elsevier Science Pub.*, 52(1): 180-198 (2007).

(Continued)

*Primary Examiner* — Kristie Shingles
(74) *Attorney, Agent, or Firm* — Knobbe, Martens, Olson & Bear, LLP

(57) ABSTRACT

The invention relates to a method for transmission of messages from a sender node to multiple destination nodes in a network in which:
The same message is sent from the sender node to multiple destination nodes, and
the destination node of a message returns an acknowledgment message to the sender node after receiving the message
it comprises a step of the distribution, by the sender node, of the destination nodes into at least two groups of destination nodes according to a predetermined distribution criterion taking into account the to and fro travel time between the sending of the message and the receiving of the acknowledgment message from the destination node, and a step of sending of messages to destination nodes in the same group with a latency period between the sending of two successive messages to the same destination nodes of the same group, the latency periods, each specific to a group and defining the throughput rate of the group being different from one group to another.

12 Claims, 2 Drawing Sheets

(51) Int. Cl.
*H04L 12/721* (2013.01)
*H04L 12/707* (2013.01)
*H04L 12/841* (2013.01)
*H04L 12/18* (2006.01)

(56) References Cited

U.S. PATENT DOCUMENTS 8,060,017 B2 * 11/2011 Schlicht ................ H04L 1/0015
 370/338

2007/0286107 A1 * 12/2007 Singh et al. .................... 370/312
2009/0141631 A1 6/2009 Kim et al.

OTHER PUBLICATIONS

Lochert et al., "A Survey on Congestion Control for Mobile Ad-Hoc Networks," *Wireless Communications and Mobile Computing*, 7(5): 655-676, www.interscience.wiley.com (2007).
Search Report issued in French application No. 1201621 (2013).

* cited by examiner

METHOD FOR TRANSMISSION IN A MULTI-DESTINATION NETWORK

This application claims priority to French Patent Application No. 1201621, filed Jun. 5, 2012, the content of which is incorporated herein by reference in its entirety.

The method is valid also for wired networks and even single hop networks. It suffices simply to have amongst the destination nodes those that are connected through links of varying transfer rates and speeds and/or having varying capacities for high performance computing and processing.

The present invention relates to a method for transmission in which:
- the same message is sent from the sender node to multiple destination nodes
- the destination node of a message returns an acknowledgment message to the sender node after receiving the message.

The invention is based in the field of multi-destination networks in which the same message must be sent to multiple destination nodes having different connection properties through possibly several intermediary nodes, the transmission rates over the different links being different as well as times for processing by the destination and/or intermediary nodes. It is more generally applicable to any multi-destination network where the characteristics of communications to reach destination nodes are different. This may be due to the following reasons:

- The links between the sender node to each of the destination nodes have different capacities and transfer speeds. This produces variable transmission and propagation delay/lag times for each destination node;
- The nodes have different computing and processing capacities. In such situations, the response time varies for each destination node;
- In the case of a multi-hop network, the destination nodes may be found to be at different numbers of hops from the sender node; the asymmetry of the network topology added to the two reasons previously mentioned above, make communication timelines different for each destination node.

Thus, in multi-destination multi-hop wireless networks, the destination nodes may be situated at one single or at multiple hops from the source.

The packets or messages are sent by the sender node at a certain rate of transfer to multiple destination nodes. This rate of transfer must take into account the transmission speed capacities over each of the links to all the potential destination nodes. In particular, this rate should take into account the capacities of the various links and possible congestion due to competing messages that have to pass over the same links. The reliability of links also affects the quality of the transmission.

With a view to seeking a solution to this problem of reliability and congestion, several solutions have been proposed through protocols.

In particular, the NACK Oriented Reliable Multicast protocol (NORM), (documented in RFC 5740) manages the reliability and the congestion control by using two separate modules. Negative acknowledgments (NACK) are used for improving the reliability of transmission and a mechanism based on TFRC (TCP Friendly Rate Control) is used to control congestion. This mechanism provides for, according to the NORM protocol, the computing of the same rate to each destination node from the acknowledgments received and defines a rate of transmission of messages for all of the destination nodes in order to satisfy the slowest destination node.

The NORM protocol penalises in a very significant manner the destination nodes enjoying high transport capacities, since their speed is aligned with the speed of the slowest node.

This solution is not suitable for optimisation of the bandwidth.

Moreover another known protocol is the SMCC protocol (Smooth Multirate Multicast Congestion Control published in the IEEE Infocom 03 Conference). This protocol provides for transmitting from the same sender node multiple streams of the same data traffic across multiple channels with increasing throughput rates. A destination node, depending on its capabilities and capacity, subscribes to the most appropriate channel.

The SMCC protocol proposes to adjust the throughput rate in each channel with a technique based on the TFRC protocol. It also allows a destination node to dynamically switch from one channel to another channel. This protocol does not manage the reliability of exchanges and is limited to simply creating a fixed number of channels, without the sender node or the destination nodes using the channels providing the data being able to affect the throughput rates of each channel.

So the SMCC protocol does not optimise bandwidth during transmissions since the sender node transmits the maximum possible data and in all the channels with the aim of reaching the maximum destination nodes.

The object of the invention is thus to provide a method, a sender node and a network for transmission of information in a multi-destination network that makes it possible to control the reliability of transmissions and to simultaneously optimise bandwidth.

To this end, the invention relates to a method for transmitting messages of the above mentioned type, characterised in that it comprises:
- a step of distribution, by the sender node, of the destination nodes into at least two groups of destination nodes according to a predetermined distribution criterion taking into account the to and fro travel time between the sending of the message and the receiving of the acknowledgment message from the destination node, and
- a step of sending of messages to destination nodes in the same group with a latency period between the sending of two successive messages to the same destination nodes of the same group, the latency periods, each specific to a group and defining the throughput rate of the group being different from one group to another.

According to particular embodiments for implementation, the method of transmission includes one or more of the following characteristic features:
- the said predetermined distribution criterion involves comparing the to and fro travel time of the message with a characteristic time interval specific to the group considered;
- the latency period for a particular determined group is less than or equal to the upper limit of the characteristic time interval specific to the group;
- for at least one group, the latency period is equal to the longest to and fro travel time for the previous message of all the destination nodes of the group;
- the said predetermined distribution criterion is recomputed over time according to the distribution of destination nodes among the groups;
- the recomputing of the predetermined distribution criterion is performed periodically;
- the recomputing of the predetermined distribution criterion is performed in order to maximise the total throughput of the network, the recomputing of the predetermined distribution criterion is performed in the case of M groups so as to maximise the function $$\sum_{i=1}^{M} N_i \frac{K}{T_{mini-i+1}} \text{ with } 1 \leq N_i \leq \text{Total} - \sum_{j=1}^{i-1} N_j$$

where M is the number of groups, $N_i$ is the number of destination nodes belonging to the group i, K is the size of messages sent, Total is the total number of destination nodes, and $T_{min\ i\ i+1}$ is the value used for the criterion of distribution between the groups i and i+1;

the recomputing of the predetermined distribution criterion is performed in the case of two groups so as to maximise the function $(N.K/T_{min1-2})+L.K/T_{max})$, where N is the number of destination nodes having sent an acknowledgment, K is a constant, $T_{min1-2}$ is the value used for the criterion of distribution between the two groups, L is the number of destination nodes that have not sent their acknowledgment, $T_{max}$ is a value greater than $T_{min1-2}$;

it includes a step of reassigning of a destination node from an original group to a destination group by the sender node at the request of the destination node.

The invention also relates to a sender node for a multiple destination message transmission network characterised in that a sender node appropriate for the transmission of messages to multiple destination nodes in a network, the node consisting of:

the means for sending the same message to multiple destination nodes, the means for receiving from each destination node a message, a message of acknowledgement upon receipt of the message, characterised in that it comprises:

the means for distribution, of destination nodes in at least two groups of destination nodes according to a predetermined distribution criterion taking into account the to and fro travel time of the message between the sending of the message and receiving the message of acknowledgment from the destination node, the means of sending messages to destination nodes of the same group with a latency period between the sending of two successive messages to the same destination nodes of the same group, these latency periods, each specific to a group and defining the throughput rate of the group being different from one group to another.

The invention also relates to a message transmission network comprising at least one sender node and multiple destination nodes wherein each destination node includes the means for returning an acknowledgment message back to the sender node upon receiving a message, characterised in that the or each sender node is as defined here above.

Each destination node includes the means for sending to the sender node a request for changing group and the sender node comprises the means for reassigning of the destination node from an original group to a destination group in accordance with the request to change groups.

The invention will be better understood upon reading the description which follows, given solely by way of example and with reference being made to the accompanying drawings in which.

Figure 1:
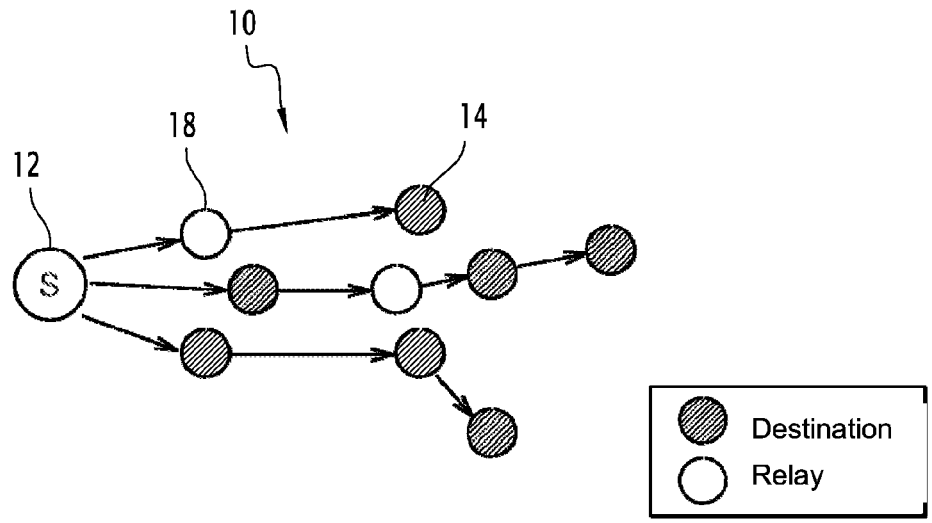
FIG. 1 is a schematic view of a portion of a multi-destination and multi-hop transmission network.

The multi-destination and multi-hop network 10 illustrated in FIG. 1 is for example a wireless network of the ad hoc type. In this diagram, the network nodes are illustrated by circles and the links between a sender node and a destination node are illustrated by arrows.

Taking into account the limitation of transmission distance on the network, and as is known per se, a message sent from a sender node 12 to a remote destination node 14 travels over a first link to an intermediary node or relay 18 and then over a second network link between the intermediary node 18 and the final destination node 14. Thus, a message can reach a destination node in a single hop or through multiple hops via intermediary nodes.

The two intermediary nodes 18 either are or not recipient destinations of the message. In FIG. 1, the destinations for the same message supposedly sent by the sender node 12 are illustrated by hatched circles while the nodes that are non destination nodes and forming only intermediary nodes are illustrated by non hatched circles.

The mode of operation of such networks is known per se and thus will not be described further. Such networks are used in particular as military tactical networks, the network nodes being formed by transmitting and receiving means carried by vehicles.

In such a network, the sender nodes are suitable for sending to groups of nodes, one message at predefined rates. These rates are defined by a latency period, separating the sending of successive messages to nodes in the same group.

According to the invention, the destination nodes of the same message are divided into at least two groups of nodes for which the messages are transmitted at distinct rates for the groups of nodes. These rates are defined by the sender node and are variable depending on the time. The nodes are divided into different groups according to a predefined distribution criterion that is implemented in an algorithm applied by the sender node based on different variables as will be explained here below. Thus, the distribution of nodes between the groups changes over time and the distribution criterion also changes over time; this being in order to optimise a particular constraint such as the total throughput of the network. The constraint optimised with the algorithm further detailed here below is the total throughput of the network defined as the sum of the throughputs of the network groups. The throughput of a group is the sum of the throughputs of the members of the group. However, other constraints may be selected and optimised within the generic framework as proposed by the invention.

Figure 2:
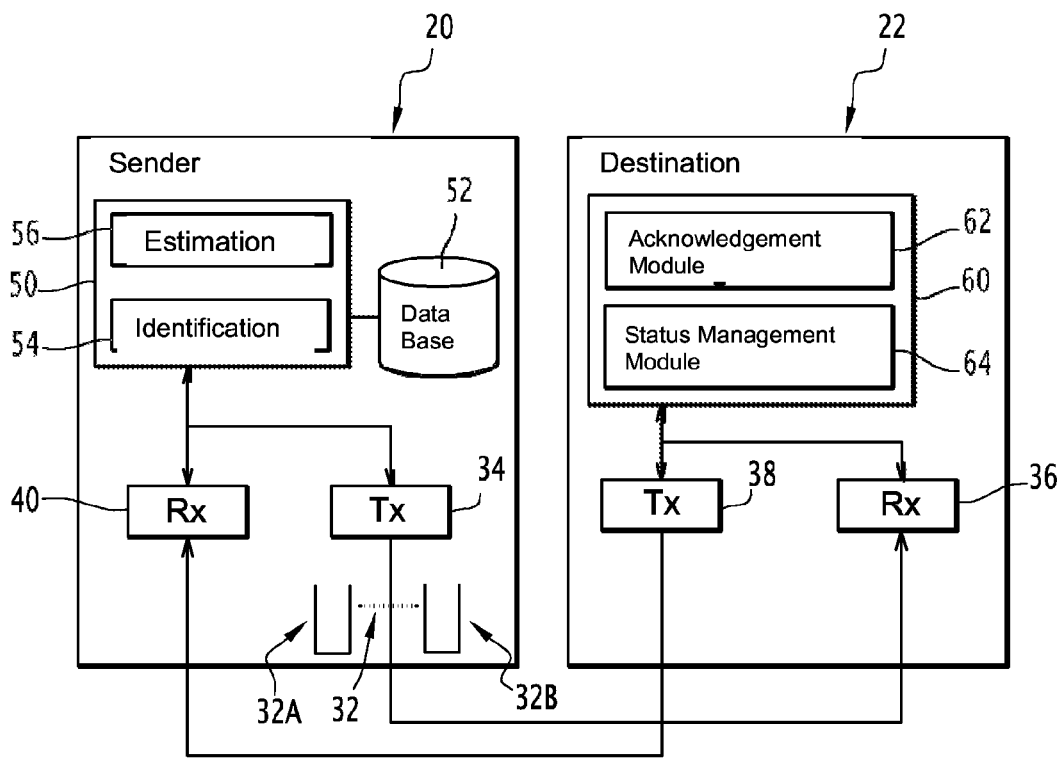
FIG. 2 is a schematic view of the structure of a sender node and a destination in the network in FIG. 1.

In FIG. 2 is shown the structure of a sender node 20 and a destination node 22. In practice, a same node is usually a sender node and a destination node based on the transmission to be carried out. A network node therefore generally includes the cumulative structures of the nodes 20 and 22.

The sender node 20 includes, for each group of destination nodes, a stack 32 in which are stored the messages to be sent, with the addresses of the destination nodes belonging to the group. Thus, a same message to be sent to the nodes of multiple groups are contained in several stacks 32.

The sender node 20 includes a transmitter module 34 capable of receiving messages from different stacks and for sending them, for the destination nodes of the same stack simultaneously, at the rate of transfer appropriate to the stack according to the protocol implemented at the destination nodes having to receive these messages.

As is known per se, each destination node 22 includes a receiver module 36 capable of receiving messages from the sender node. Each destination node also includes a transmitter module 38 capable of retransmitting the message to the final destination node if the destination node acts as a relay node. This transmitter module 38 is also capable of transmitting, upon receipt of a message, an acknowledgment message to the sender node to confirm the proper reception or otherwise of the message previously received from the sender node, or also a status message.

The sender node 20 includes, for receiving messages, a receiver module 40 capable of receiving acknowledgment messages, or status messages such as a request to change the group of a destination node.

When a same node is both a sender node and a destination node, the transmitter module 34, 38 and receiver module 36, 40 are respectively constituted by a same module or not.

The sending node 20 includes, in addition to the transmission modules 34 and 40, an information processing unit 50 connected to a database 52.

The database 52 contains, for each potential destination node of the network, the group to which it belongs. Preferably, in addition, for each destination node, the database includes the average travel time to and fro observed between the sender node and the destination node considered. This average to and fro travel time is for example the sliding mean travel time recorded over a window of successive N values.

The to and fro travel time is the time elapsing between the time of sending of a message to a destination node and the time of receipt by the sender node of the acknowledgment message sent by the destination node that has received the message.

The information processing unit 50 includes in addition to the means known per se, suitable for the management of the sender node, an identification module 54 capable of determining for each message sent from the sender node to a destination node the to and fro travel time. To this end, the identification module determines, from a clock signal, the time of sending of a message by the sender node and the time of receipt of the message of acknowledgment coming from the destination upon receiving this message. It deduces therefrom the to and fro travel time of this message.

The information processing unit 50 in addition also includes an estimation module 56 capable of defining the criterion for distribution of the destination nodes between the different groups and of ensuring, over time, the distribution of these nodes into the groups according to the distribution criteria defined at the moment of time under consideration.

Figure 4:
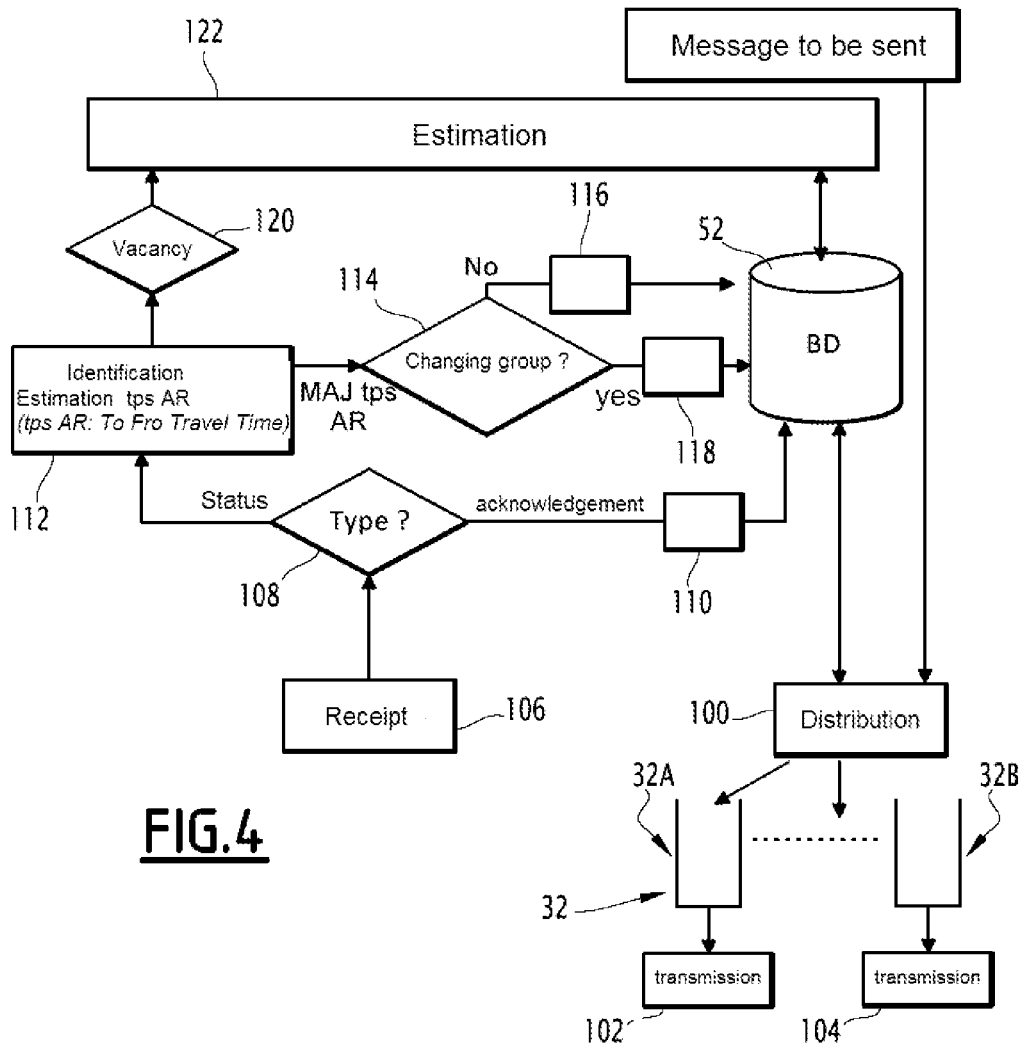
FIG. 4 is a flowchart of the method implemented in a sender node and of the network in FIG. 1.

In a general sense, the unit 50 is capable of ensuring the implementation of the algorithm whose flowchart is shown in FIG. 4.

Each destination node 22 also comprises an information processing unit 60 for ensuring the management of the node. This unit includes an acknowledgment module 62 capable of controlling the sending by the destination node to the sender node of a message of acknowledgment of a message, for each message received.

As is known per se, several strategies for managing the acknowledgment process may be implemented. For example, the initial message is segmented and transferred into small segments and it is only upon receipt of the final segment that the destination node sends an acknowledgment that specifies the segments that have been properly received and those that have been lost.

A strategy is implemented by the sender node upon receipt of the acknowledgment message if a transmission problem has been noted. This strategy is of all types known suitable for the partial or complete retransmission of the message and will not be described here.

Unit 60 also includes a module 64 for the management of status. This module is suitable for notifying in an explicit manner, in the form of a status note sent to one or more sender nodes, a change that has occurred at the destination node. This change could be for example a congestion of the network or even a change in the status of the destination node itself, that is to say, an inability to receive messages at a high rate or a change in ownership of connections. This situation is for example characteristic of the request from a destination node to move from a high transmission rate group to a lower transmission rate group or, conversely, from a low transmission rate group to a higher transmission rate group.

According to the invention and for each sender node considered, the potential destination nodes are divided into at least two groups. Each group of nodes is characterised by its own message transmission rate. These rates of transmission and/or the distribution of nodes between the groups of destinations vary over time depending on the predetermined distribution criterion which itself is advantageously variable over time.

The transmission rates are different from one group to another.

Figure 3:
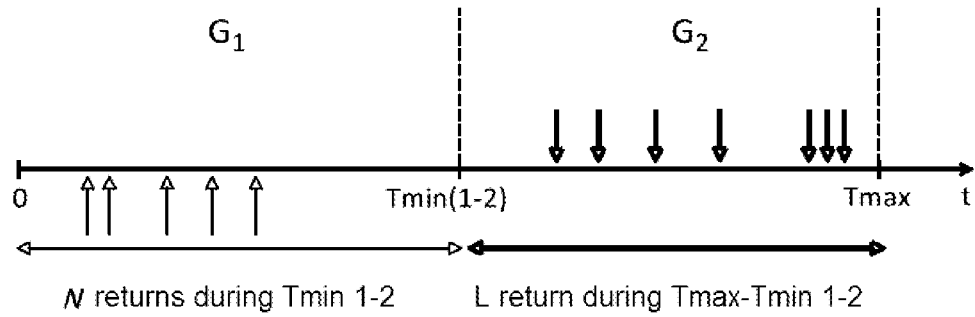
FIG. 3 is a schematic representation of the distribution of the nodes of the network into two distinct groups according to the invention.

In the example considered, and illustrated in FIG. 3, the nodes are divided into only two groups. A larger number of groups is chosen by way of a variant.

The destination nodes are divided between the two groups based on a criterion relating to the average to and fro travel time of a message between the sender node and the destination node.

Thus the destination nodes for which the average to and fro travel time is between 0 and $T_{min1-2}$ are the elements of the first group G1, the so called 'fast' group. It is assumed that N elements are included in this first group, each node in the first group being illustrated by a vertical upward arrow positioned along the axis of time, at the average to and fro travel time of a message between the sender and this node.

In the same way, L nodes whose average to and fro travel time is between $T_{min\ 1-2}$ and a value $T_{max}$ are members of the second group G2, the so called 'slow' group. They are also represented by a vertical arrow but pointing downward at their own specific average travel time.

Thus, each group is characterised by a characteristic interval $[0, T_{min1-2}]$ or $[T_{min1-2}, T_{max}]$ containing the average travel times to and fro for the nodes of this group.

The algorithm illustrated in FIG. 4 is capable of controlling the sending of messages with a transmission rate that is specific for each group based on the group to which the message's destination node belongs, and is also capable of modifying over time, the distribution of nodes between groups, in particular by modifying the predetermined distribution criteria defining the boundary between the different groups.

In the example considered, this criterion corresponds to a comparison of the average travel time to and fro at the value $T_{min1-2}$, which value $T_{min1-2}$ varies over time, as will be explained in the following description.

For a message to be sent, and as illustrated in FIG. 4, the message is sent to the transmitter module 34 of the sender node with the list of nodes to be considered as destinations.

During a step 100, the message is distributed, possibly with the transfer of the message into the stacks 32 depending upon the nodes to be considered as destinations. The stack of the nodes of the fast group is denoted 32A while the stack of the nodes of the slow group is denoted 32B.

At steps 102 and 104 the messages present in the stacks 32 are each sent to the destination nodes with the transmission rate specific to the group.

In the example considered, the messages to be sent to the nodes of the group G1 transmitted at step 102 are sent at a regular frequency and by being spaced out with a latency period equal to the value $T_{min1-2}$ used as a criterion for distribution between the groups G1 and G2.

In step 104, the messages to be sent to the destination nodes of the second group G2 are sent with a latency period equal to the predetermined value $T_{max}$ or at the maximum travel time to and fro between the sender node and destination nodes for the previous message, the latter value being taken is if it is less than T.

The sender node continuously listens at step 106 to the acknowledgment or status messages that are sent by the other nodes in the network.

At step 108, it determines the nature of the messages received.

If the received message is a status message containing an explicit request from a destination node to change group, an entry is made in the database 52 at step 110 and the node is transferred from its original group to the requested destination group.

If the message received is an acknowledgment message, the message and its time of receipt are processed in an Identification step 112 carried out by the estimation module 54. During this step, the average travel time to and fro of the message is determined. In step 114, this to and fro travel time is compared to the threshold $T\text{-}2_{-min1}$. If the average to and fro travel time continues to remain in the interval characteristic of the current group of the destination node, the node is maintained in the group.

Conversely, if the average to and fro travel time is not included within the interval characteristic of the group being considered, the destination node is re-placed in the group whose characteristic interval contains an average to and fro travel time recorded by the entry in the database 52 at step 118.

At the end of $T_{min1-2}$ all the destination nodes that have not responded are considered to be slow, the message sent is transferred to the stack of the group G2 the so called slow group. The message remains in this stack until its acknowledgement by all nodes in the slow group. This is the moment when the last stack is emptied taking into consideration that all the destination nodes have indeed been served.

At step 120, the processing unit 50 determines the vacancy periods, that is to say periods during which no message is sent or received. During these periods, the step 122 of re-estimation the criterion of distribution between the groups is implemented by the estimation module 56.

As a variant, step 122 is performed periodically and not just during the vacancy periods.

The distribution criterion is modified during the step of estimation 122 with a view to maximising the number of destination nodes served at maximal throughput.

In the example considered, the estimation of the value $T_{min1-2}$ serving as a variable for the distribution criterion is done in the following manner.

The value of $T_{min1-2}$ is calculated so as to ensure an optimal throughput for each group of destination. This optimal throughput rate corresponds to the maximisation of the total throughput of the network.

A mechanism for the dynamic calculation of $T_{min1-2}$ makes it possible to monitor the change in size of the groups and to ensure that each group obtains a proper throughput that maximises the use of network resources. This algorithm also allows for starting from a simple initial configuration to find an optimal operating point. The algorithm for calculation of $T_{min1-2}$ is called up periodically and/or during the vacancy period of the network as explained above.

In a system with two groups, the value of $T_{min1-2}$ determines the throughput obtained by the first group. Indeed, the destination nodes of this group will be served with a new message at the very latest only after the time $T_{min1-2}$ has elapsed. The resulting throughput thus obtained by the fast group G1 is message_size/$T_{min1-2}$ where message_size is the number of bytes contained in the message to be sent. In a similar fashion, the throughput observed by the slow nodes of the group G2 is approximated by message_size/$T_{max}$, where $T_{max}$ is the maximum waiting time.

The objective of estimating $T_{min}$ is to obtain the maximisation of the total throughput observed by the network which may also be viewed as the maximisation of the number of destination nodes served at a maximum throughput rate. This is formally written in the following manner:

$$\text{Max}(N.K/T_{min1-2})$$

where K is a constant and N is the number of destination nodes of the fast group G1.

According to the formula here above, the throughput rate increases linearly with N and decreases with $T_{min1-2}$. In other words, in order to improve the throughput of the fast group G1, it is necessary to wait for the return reply from a maximum of destination nodes but also to have the shortest possible waiting time. Practically, these two constraints are contradictory and the estimation of the optimal $T_{min1-2}$ comes down to finding the breaking point or extremum in the function.

Estimating the breaking point, that is to say $T_{Tmin1-2}$, depends on the optimisation constraint selected in the network. One possible solution is to rely on the objective of maximising the throughput of the system by comparing the case where a destination node who sends a return reply is considered fast compared to the case where the latter is considered slow. That comes down to matching $T_{Tmin1-2}$ to the to and fro travel time from a destination node and calculating which $T_{Tmin1-2}$ maximises the throughput with the following formula:

$$(N.K/T_{min1-2})+L.K/(T_{max})$$

where N is the number of destination nodes that have sent an acknowledgment counting the destination node which has just sent its acknowledgment and L is the number of destination nodes that have not yet sent their acknowledgment (total number−N).

The preceding formula compares the throughput rate of the two groups. In order for an optimisation of performance, this sum should be maximised in other words to have a maximum throughput for the fast group while keeping a reasonable number of destination nodes in each of the groups.

Given that the calculation of $T_{min1-2}$ is carried out periodically or in case of vacancy of the system, there are little or no constraints related to calculation time to be imposed.

An example of an algorithm that uses the metrics presented is as follows:

Steps of the algorithm:

---

Inputs
- NB //Number_of_destinations
- Tps_AR[NB] //table of AR [to - fro travel times] for each -continued

```
        destination (can be a weighted average)
        - T_max          //Depends on network size, type of traffic...
        - max, index     //intermediary variables
Return (output)
        - Value of T_min1-2
    Execution Sequence
        - sort Tps_AR [NB]
        - max = 0 (initialisation)
        - as long as j < NB
            calculation result = ( j. K/Tps_AR[0]) + (NB–j).K/(T_max)
            if result > max
            max = result
            index = j
            end if
            end as long as
        - T_min1-2 = Tps_AR[index] + Epsilon //the return from the index
          enables the estimation of the number of destinations in the group
END
```

The algorithm calculates the optimal value of $T_{min1-2}$ based on the maximisation criterion used; that is in this case, the maximisation of the total network throughput. The algorithm is implemented by the sender node at the time when the calculation of a new value of $T_{min\ 1-2}$ is necessary thus once the database in FIG. 2 contains the to and fro travel times for all the destination nodes. The to and fro travel times are first sorted in ascending order, then $T_{min1-2}$ is positioned just after the to and fro travel times (Tps_AR[j]) for each destination. By positioning $T_{min1-2}$, the total network throughput thus obtained is calculated. This procedure is repeated for all the destination nodes and the maximum throughput as well as the value Tps_AR[j] that maximises this throughput are kept in in the intermediary variables (max and index). The algorithm returns at the end of its execution the value of $T_{min1-2}$ located just after the to and fro travel time that offers the best total network throughput. More generally, the recalculation of the predetermined criterion is done in the case of M groups in order to make maximise the function $$\sum_{i=1}^{M} N_i \frac{K}{T_{mini-i+1}} \text{ with}$$

$$1 \leq N_i \leq \text{Total} - \sum_{j=1}^{i-1} N_j$$

where M is the number of groups, $N_i$ is the number of destination nodes belonging to the group i, K is the size of the messages sent, Total is the total number of destination nodes, and $T_{min\ i-i+1}$ is the value used for the criterion of distribution between the groups i and i+1.

The new criterion for segmentation between the groups is applied during step 122 and the groups are thus modified and stored in the database 52.

Moreover, during the transmission, the status messages received from a destination node indicating the inability to follow the transmission rate imposed by the transmitter node in a particular group force a switch of the destination node to a slower group when possible. The sending of such a status message is caused by a change in the properties of links to a particular destination or even by a change in the mode of operation of the destination node.

The unequal distribution of nodes between the groups forces a recalculation of $T_{min1-2}$ in order to find the optimal value based on the constraints to be maximised.

Moreover, the total or partial incorrect transmission of messages is processed by a specific processing unit of the sender node 20 in order to ensure the retransmission based on an algorithm known per se that enables the achievement of a satisfactory transmission quality for the underlying service. The simplest solution consists of retransmitting erroneous messages for each group.

It is conceivable that such an algorithm enables the optimisation of the bandwidth on account of the changing distribution of destination nodes between the groups and that it contributes to ensuring the reliability of the transmission by means of the acknowledgments received, which are also used for the distribution between groups.

The invention claimed is:

1. A method for transmission of messages from a sender node to multiple destination nodes in a network in which:
   a same message is sent from the sender node to multiple destination nodes,
   the destination node of a message returns an acknowledgment message to the sender node after receiving the message,
   the method comprising:
   distributing, by the sender node, the destination nodes into at least two groups of destination nodes according to a predetermined distribution criterion taking into account the to and fro travel time between the sending of the message and the receiving of the acknowledgment message from the destination node, the predetermined distribution criterion involving comparing the to and fro travel time of the message with a characteristic time interval specific to the group considered ([0, $T_{min\ 1-2}$]; [$T_{min\ 1-2}-T_{max}$]); and
   messages to destination nodes in the same group with a latency period between the sending of two successive messages to the same destination nodes of the same group, the latency periods, each specific to a group and defining the throughput rate of the group being different from one group to another.

2. The method according to claim 1, further comprising the latency period for a particular determined group being less than or equal to the upper limit of the characteristic time interval specific to the group.

3. The method according claim 1, further comprising for at least one group, the latency period being equal to the longest to and fro travel time for the previous message of all the destination nodes of the group.

4. The method according claim 1, wherein the predetermined distribution criterion is recomputed over time according to the distribution of destination nodes among the groups.

5. The method according to claim 4, further comprising the recomputing of the predetermined distribution criteria being performed periodically.

6. The method according to claim 4, further comprising the recomputing of the predetermined distribution criterion being performed in order to maximize the total throughput of the network.

7. The method according to claim 6, and wherein the recomputing of the predetermined distribution criterion is performed in the case of M groups so as to maximize the function $$\sum_{i=1}^{M} N_i \frac{K}{T_{mini-i+1}} \text{with } 1 \leq N_i \leq \text{Total} - \sum_{j=1}^{i-1} N_j$$

where M is the number of groups, $N_i$ is the number of destination nodes belonging to the group i, K is the size of messages sent, Total is the total number of destination nodes, and $T_{min\ i\ i-1}$ is the value used for the criterion of distribution between the groups i and i+1.

8. The method according to claim 7, further comprising the recomputing of the predetermined distribution criterion is being performed in the case of two groups so as to maximize the function $(N.K/T_{min\ 1-2})+L.K/T_{max})$, where N is the number of destination nodes having sent an acknowledgment, K is a constant, $T_{min1-2}$ is the value used for the criterion of distribution between the two groups, L is the number of destination nodes that have not sent their acknowledgment, $T_{max}$ is a value greater than $T_{min1-2}$.

9. The method according to claim 1, further comprising reassigning a destination node from an original group to a destination group by the sender node at the request of the destination node.

10. A sender node appropriate for the transmission of messages to multiple destination nodes in a network the node comprising:
    means for sending a same message to multiple destination nodes;
    means for receiving from each destination node a message of acknowledgement upon receipt of the message;
    means for distributing destination nodes in at least two groups, of destination nodes according to a predetermined distribution criterion taking into account the to and fro travel time of the message between the sending of the message and receiving the message of acknowledgment from the destination node, the predetermined distribution criterion involving comparing the to and fro travel time of the message, with a characteristic time interval specific to the grow considered ([0, $T_{min\ 1-2}$]; [$T_{min\ 1-2}-T_{max}$]); and
    means for sending messages to destination nodes of the same group with a latency period between the sending of two successive messages to the same destination nodes of the same group, these latency periods, each specific to a group and defining the throughput rate of the group being different from one group to another.

11. A network for transmission of messages comprising at least one sender node and multiple destination nodes wherein each destination node includes means for returning an acknowledgment message back to the sender node upon receiving a message,
    wherein at least one of the sender nodes is according to claim 10.

12. The network according to claim 11, wherein each destination node includes means for sending to the sender node a request for changing group and wherein the sender node comprises means for reassigning of the destination node from an original group to a destination group in accordance with the request to change groups.

* * * * *